United States Patent [19]

Lewis

[11] 4,318,247

[45] Mar. 9, 1982

[54] PLANT SUPPORTING

[76] Inventor: Charles W. Lewis, 2612 Georgia Ave., NW., Washington, D.C. 20001

[21] Appl. No.: 135,116

[22] Filed: Mar. 28, 1980

Related U.S. Application Data

[63] Continuation-in-part of Ser. No. 9,184, Feb. 2, 1979, abandoned.

[51] Int. Cl.³ .............................................. A01G 17/10
[52] U.S. Cl. ...................................................... 47/43
[58] Field of Search .................................... 47/42–43, 47/47

[56] References Cited

U.S. PATENT DOCUMENTS 2,004,983  6/1935  Goldberg ............................... 47/47
2,817,190  12/1957  Matson .................................... 47/47

FOREIGN PATENT DOCUMENTS 119491  8/1947  Sweden ................................... 47/42

*Primary Examiner*—Robert E. Bagwill
*Attorney, Agent, or Firm*—Cushman, Darby & Cushman

[57] ABSTRACT

A plant supporting device and method of utilization thereof which provide proper support and light-orientation of non-ligneous plant members without the necessity of ties, strings, or the like. The device comprises an integral structure made of a homogeneous corrosion-resistant relatively rigid material and includes a pair of arms, a substantially linear ground engaging support with a tapered, rounded end, and a transition between the support and arms. The arms and junction therebetween are disposed in a common plane, and the transition is disposed so that the common plane makes an acute angle with the support. The acute angle is preferably about 20°. The arms, junction, and transition are Y-shaped, and the plant member to be supported is disposed between the arms during use.

6 Claims, 7 Drawing Figures

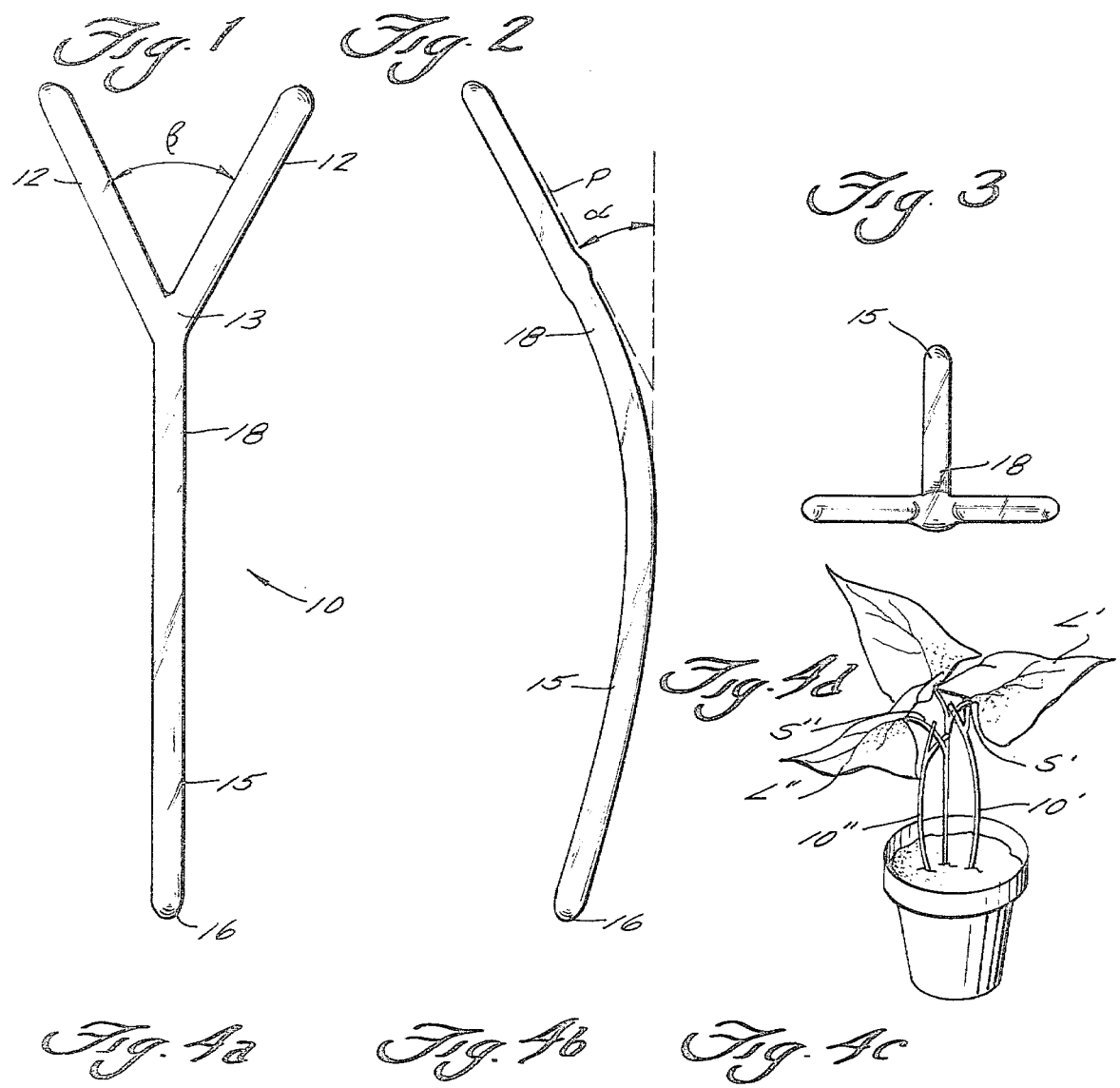

PLANT SUPPORTING

CROSS REFERENCE TO RELATED APPLICATIONS

This application is a continuation-in-part of my application Ser. No. 9,184 filed Feb. 2, 1979, now abandoned.

BACKGROUND AND SUMMARY OF THE INVENTION

A large variety of house plants, as well as a number of different vegetable and flowering outdoor plants, primarily non-ligneous plants, develop plant members that are too heavy for the supporting stems, or the like. The leafs, fruit, flowers, blossoms, stems, or the like will then bend or droop, adversely affecting the aesthetics of the plant, and in some cases impairing the plant's health. It is therefore desirable to provide plant supporting structures to maintain the plants in desired positions or configurations.

Conventionally, plant supporting devices have utilized ties, strings, and like components for holding various plant components to rigid supporting structures. Such structures can be difficult to properly locate, however, and can restrict plant devlopment if the strings are too tight, and are not designed for ready repositioning as the plant grows.

According to the present invention there is provided a plant supporting device, and method of utilization thereof, which provide for ready support of and proper light orientation of, a wide variety of plant members of non-ligneous plants without the necessity for ties, strings, or the like. The plant supporting device according to the present invention is simple and inexpensive to make, aesthetically pleasing, and is easily adjusted and repositioned during various stages of plant growth.

The plant supporting device according to the present invention consists essentially of an integral structure including a pair of arms and a junction between the arms, the arms and junction being disposed in a common plane; a substantially linear ground-engaging support; and means for providing a transition between the substantially linear support and arms junction so that said common plane makes an acute angle with said substantially linear support. The acute angle is preferably about 15° to 25°, and about 20° is found to be the optimum for providing sufficient support and light-orientation.

The ground-engaging support comprises a rod having a tapered, rounded bottom ground-penetrating portion which facilitates insertion of the device into place adjacent a plant without destruction of the plant roots. The arms, ground-engaging support, and transition means integral structure consists of—in the preferred embodiment—a circular cross section rod of a homogeneous corrosion-resistant relatively rigid material, such as glass, plastic (e.g. polyethylene), or other suitable materials. The material may be clear, colored (e.g. green), and preferably is inert.

Desirably, the arms, junction, and transition are Y-shaped, with the arms making an angle of about 60° with respect to each other.

Also, according to the present invention there is provided a method of supporting non-ligneous plant members such as leafs, stems, flowers, blossoms, and the like, and properly light-orienting same without utilizing ties, strings, or the like. The method is practiced utilizing the plant supporting device according to the invention, and consists of about four basic steps. First, a supporting device is selected having a height appropriate for properly supporting and light-orienting the particular non-ligneous plant member to be supported. Then the tapered end of the device is inserted into the soil adjacent the plant with the device arms facing away from the main stem of the plant. This insertion is preferably practiced by slowly rotating the device from side to side while applying a slight downward force. Then the arms of the device are slowly turned so that they face the plant, and finally the plant member to be supported is disposed between the arms, and care is taken to adjust the depth in the soil or angular orientation of the device as necessary depending upon the position and orientation of the plant members. The above steps are repeated for each plant member of a plant to be supported.

It is the primary object of the present invention to provide a plant supporting device, and method of utilization thereof, that readily provide proper support and light-orientation for a wide variety of plant members without requiring the use of strings, ties, or the like. This and other objects of the invention will become clear from an inspection of the detailed description of the invention from the appended claims.

BRIEF DESCRIPTION OF THE DRAWINGS

FIGS. 1 through 3 are front, side, and top views, respectively, of an exemplary plant supporting device according to the present invention; and FIGS. 4a through 4d schematically illustrate sequential steps in practicing an exemplary method according to the present invention.

DETAILED DESCRIPTION OF THE DRAWINGS

An exemplary plant supporting device according to the present invention is illustrated generally at 10 in the drawings. The device consists of an integral structure, preferably of a homogeneous corrosion-resistant material that is relatively rigid as compared to plant members that the device 10 will be supporting. Suitable materials include glass, and various plastics, such as polyethylene, which structures can be blow molded, injection molded, or formed in other conventional manners. The material may be transparent or colored (e.g. green), and the material is inert with respect to the soil in which it is to be disposed and the plant members that it is to support.

The device 10 generally comprises three basic components. The first component is a pair of arms 12 having a junction 13 therebetween, the arms and junction being disposed in substantially a common plane, as indicated in dotted line at P in FIG. 2. The arms make an angle $\beta$ (see FIG. 1) with respect to each other, the angle $\beta$ preferably being about 60°, although it can be varied depending upon the size of the plant members the device 10 is designed to support.

The second component of the device 10 comprises a substantially linear ground-engaging support 15. The support 15 preferably is a rod having a tapered, rounded bottom ground-penetrating portion 16. The ground-penetrating portion 16 is designed to facilitate insertion of the support 15 into soil adjacent a plant without causing damage to the plant roots.

The third component of the device 10 comprises means providing a transition between the portions 15 and 13 so that the plane P makes an acute angle $\alpha$ with the substantially linear support 15. Such transition means are illustrated generally at 18 in the drawing, and as illustrated in the drawing preferably merely comprises a smooth transition of the same integral structure between the support 15 and the junction 13. The angle α (see FIG. 2 in particular) is preferably about 15° to 25°, and about 20° has been determined to be the optimum for insuring proper support and light-orientation of plant members supported by the device 10. Preferably the arms 12, support 15, and transition means 18 integral structure consists of circular cross-section rods, as illustrated in the drawings, and preferably the arms 12, junction 13 and transition means 18 are Y-shaped (as seen most clearly in FIG. 1) for optimum results.

Utilizing the device 10 according to the present invention, a method of supporting plant members (especially non-ligneous plant members) and properly orienting the same without utilizing ties, strings, or the like is provided. The method can be readily seen with reference to FIGS. 4a through 4d, the method consisting of the following steps: (a) Selecting a support device 10 having a height appropriate for properly supporting and light-orienting the particular non-ligneous plant member to be supported, such as the stems at junction. (b) Inserting the tapered end 16 of the device 10 into the soil adjacent the plant with the device arm 12 facing away from the main stems of the plant so that the support 15 is substantially vertical (see FIG. 4a). This step is preferably practiced by slowly rotating the device 10 from side to side (see the arrows in FIG. 4a) while applying a slight downward force. (c) Slowly turning the arms 12 of the device 10 so that they face the plant (see FIG. 4b). And (d) disposing the plant member to be supported (stems at junction in the drawings) between the arms 12, taking care to adjust the depths of the support 15 in the soil, or the angular orientation of the device 10, as necessary depending upon the position and orientation of the plant members to be supported (see FIG. 4c). The arms 12 will engage the opposite sides of the plant member being supported and hold the plant member in the desired orientation.

The above method steps may be repeated for each plant member of a plant to be supported, and any desired configuration may be provided. For instance see FIG. 4d wherein one device 10' supports the stem S' of leaf L', and another device 10" supports stem S" of leaf L".

It will thus be seen that according to the present invention a plant supporting device and method have been provided that facilitate proper light-orienting support of a wide variety of plant members in a quick, simple manner, without the utilization of ties, strings, or the like, and being readily reusable and repositionable. While the invention has been herein shown and described in what is presently conceived to be the most practical and preferred embodiment thereof it will be apparent to those of ordinary skill in the art that many modifications may be made thereof within the scope of the invention, which scope is to be accorded the broadest interpretation of the appended claims so as to encompass all equivalent structures and methods.

What is claimed is:

1. A plant supporting device consisting essentially of an integral structure consisting of circular cross-section rod of a homogeneous corrosion-resistant relatively rigid material, the integral structure including:

a pair of arms, and a junction between the arms, the arms and junction being disposed in a common plane;

a substantially linear ground-engaging support;

means for providing a transition between the substantially linear ground-engaging support and said junction so that said common plane containing said arms and junction make an acute angle of about 15° to 25° with said substantially linear support; and said arms, junction, and transition means being Y-shaped.

2. A device as recited in claim 1 wherein said arms make an angle of about 60° with respect to each other.

3. A device as recited in claim 2 or 1, wherein said acute angle is about 20°.

4. A method of supporting non-ligneous plant members and properly light-orienting same, without utilizing ties, strings, or the like utilizing an integral support device having a pair of arms, a transition, and a linear ground-engaging support with a tapered, rounded end, the arms and transition making a Y and the support and a plane containing the arms making an angle of about 15°-25°; said method consisting essentially of the steps of:

(a) selecting a support device having a height appropriate for properly supporting and light-orienting the particular non-ligneous plant member to be supported;

(b) inserting the tapered end of the device into the soil adjacent the plant with the device arms facing away from the main stem of the plant, so that the support is substantially vertical;

(c) slowly turning the arms of the device so that they face the plant; and (d) disposing the plant member to be supported between the arms, adjusting the depth in the soil or angular orientation of the device as necessary depending upon the position and orientation of the plant members.

5. A method as recited in claim 4 wherein step (b) is practiced by slowly rotating the device from side-to-side while applying a slight downward force.

6. A method as recited in claim 4 wherein steps (a)–(d) are repeated for each plant member of a plant to be supported.

* * * * *